United States Patent [19]

Hrastnik

[11] 4,155,646

[45] May 22, 1979

[54] PRINTING HEAD ASSEMBLY

[75] Inventor: Walter Hrastnik, Chicago, Ill.

[73] Assignee: Bell & Howell Company, Chicago, Ill.

[21] Appl. No.: 864,032

[22] Filed: Dec. 23, 1977

[51] Int. Cl.² ............................................. G03B 27/10
[52] U.S. Cl. ..................................... 355/110; 226/86; 352/224; 355/48
[58] Field of Search ............. 355/98, 110, 111, 47–49, 355/31; 352/97, 224; 226/86

[56] References Cited

U.S. PATENT DOCUMENTS 3,471,232  10/1969  Morris .............................. 355/111 X Primary Examiner—Richard A. Wintercorn
Attorney, Agent, or Firm—Robert J. Schneider; Roger M. Fitz-Gerald

[57] ABSTRACT

A printing head assembly is disclosed for use in a contact film printer for exposing raw stock film with a preprint film or negative. The printing head assembly includes an aperture jaw through which light is projected onto the film strips to transfer the images from the preprint film onto the raw stock. The printing head is adapted to be mounted with the aperture jaw adjacent a drive sprocket for driving the film webs past the aperture in a contact relationship and at a predetermined rate. The edge of the preprint film strip opposite the drive sprocket is supported by a shoulder or idler ring rotatably mounted within the printing head by a stationary support shaft. The support shaft is mounted with its axis extending at a small angle with respect to the horizontal. The rotating shoulder thus rotates in a plane offset from the vertical to permit sufficient clearance for the printing light beam to be projected through the printing aperture.

17 Claims, 4 Drawing Figures

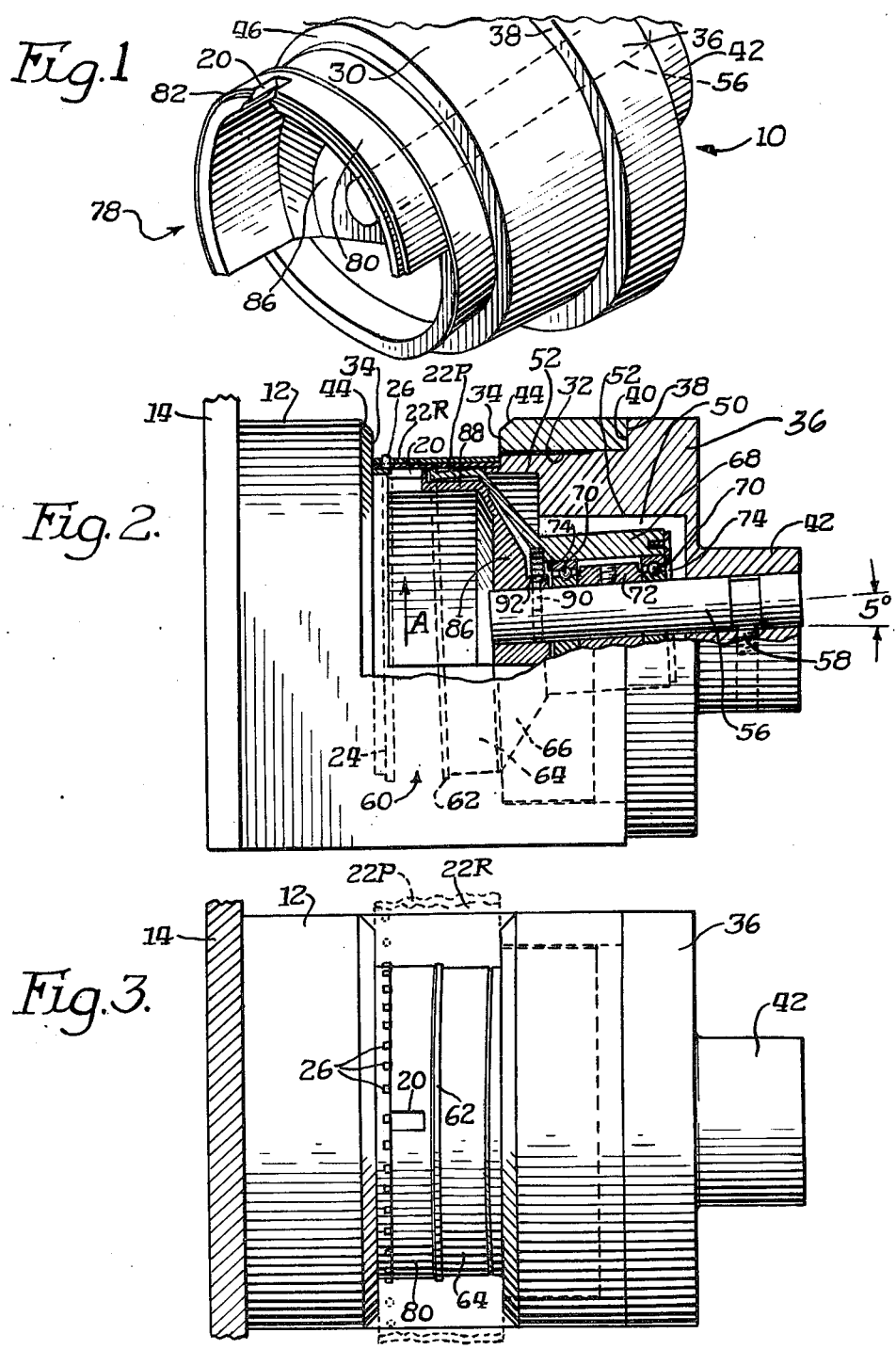

PRINTING HEAD ASSEMBLY

BACKGROUND OF THE INVENTION

1. Field of the Invention

The present invention relates to contact motion picture film printers and, in particular, relates to an improved film strip support shoulder for guiding film strips past the projection aperture.

2. Brief Description of the Prior Art

Prior art continuous contact motion film printers are designed to accommodate the printing of two different types of film formats. The two most common film formats are 16 mm film and 32 mm/35 mm film. The 32 mm/35 mm format is printed during the travel of the preprint film and raw stock film past a printing aperture or aperture jaw in one direction, or one path. The 16 mm film format is normally printed by first running the raw stock film through the printer in one direction past an aperture which is less than half the width of the previously discussed aperture. Then the raw stock film is turned around and run through the printer in the opposite direction exposing the other half of the 35 mm film with the same aperture.

In some prior film printers, the printing head was designed to operate in both modes, having a two position aperture jaw, one for printing the 32/35 mm format and one for printing the 16 mm format. However, in most of these prior art printers, a solid guide rail is used at approximately the midpoint of the raw stock film strip for supporting the center thereof to provide an accurate printing since the preprint film, being of the 16 mm size, needs support on its edge opposite the film strip. Although the design of these guide rails was optimized to provide high quality surface finishes, there is considerable film damage caused by these stationary rails. In addition, current highspeed film printers will generate sufficient frictional heat between the film and the solid rail to severely damage the preprint film which, in some cases, cannot be reproduced.

SUMMARY OF THE INVENTION

An object of the present invention is to provide a new and improved motion picture film head assembly.

Another object is to provide a printing head which eliminates the center stationary guide rail without loss of printing light beam illumination for uniformity across the printing aperture.

Briefly, the present invention contemplates a printing head assembly for use in a contact film printer to expose raw stock film with a preprint film or negative. The printing head assembly includes an aperture jaw through which light is projected onto the film strips to transfer the images from the preprint film onto the raw stock. The printing head is adapted to be mounted with the aperture jaw adjacent a drive sprocket for driving the film webs past the aperture in a contact relationship and at a predetermined rate. The edge of the preprint film strip opposite the drive sprocket is supported by a rotating shoulder or idler ring rotatably mounted within the printing head by a stationary support shaft. In a preferred embodiment for incorporation, for example, in contact printers manufactured by Bell & Howell Company, the support shaft is mounted in a vertical plane with its axis extending at an angle of approximately 5° with respect to the horizontal. The rotating shoulder thus rotates in a plane offset 5° from the vertical to permit sufficient clearance for the printing light beam to be projected through the printing aperture.

The rolling shoulder or guide rail will support both the 16 mm preprint and 32/35 mm raw stock film without inducing scratches or other abrasions to the preprint film since the shoulder rotates with the film. The angular mounting of the shaft mounts the rolling shoulder at an angle with respect to the vertical to provide clearance for the printing light beam to the aperture.

Other objects, features and advantages of the invention will be apparent from the following detailed description taken in connection with the accompanying drawings.

BRIEF DESCRIPTION OF THE DRAWINGS

FIG. 1 is a perspective view of a printing head assembly made in accordance with the concepts of the present invention;

FIG. 2 is a fragmentary, side elevation of the printing head of FIG. 1;

FIG. 3 is a top plan view of the printing head assembly of the present invention.

DESCRIPTION OF THE PREFERRED EMBODIMENT

Figure 4:
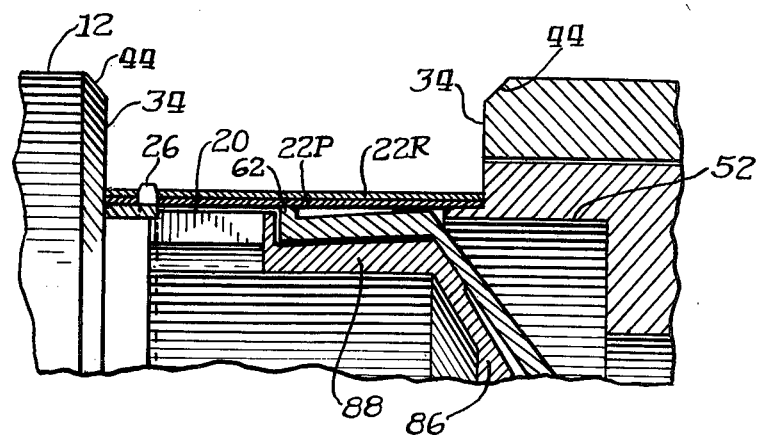
FIG. 4 is a more detailed view of a portion of the elevational view shown in FIG. 2.

A printing head assembly made in accordance with the concepts of the present invention is shown in a perspective view in FIG. 1, generally designated by the reference numeral 10. The printing head assembly 10 is mounted within a stationary, generally cylindrical housing or sleeve 12 (FIG. 2) mounted to the front wall 14 of a contact motion picture film printer. A film printer of this type is shown in copending United States Application Ser. No. 750,084 filed Dec. 13, 1977 assigned to the assignee of the present invention. A printing light beam is provided from below the wall 40 directed along a vertical axis 1 in the direction of arrow A through a printing aperture 20 (FIGS. 1 and 3). In operation, a pair of film strips (FIG. 3) are moved across the aperture 20 at a predetermined rate for exposure by the printing light beam. The film strips include a preprint film strip 22P which is adjacent the aperture 20 and a raw stock film web 22R in contact relation therewith so that the raw stock film 22R is exposed to the images on the preprint film 22P.

The film printer includes a drive motor (not shown) which drives a film printing or drive sprocket 24 at a predetermined rate. The teeth 26 of the sprocket 24 engage the sprocket holes in both of the film strips to simultaneously move the film strips past the printing aperture. Conventionally, a roller is also provided to engage the upper side of the raw stock film to maintain the contact relationship, particularly in the area of the printing aperture. Such printers are shown in U.S. Pat. Nos. 2,235,907 and 2,240,083.

As discussed briefly above, these types of film printers are adapted to print either 32/35 mm film formats or 16 mm formats. Referring to FIG. 3, the film strips down in the top view are approximately representative of the 32/35 mm format as used in professional motion pictures. This type of film format requires the use of an aperture 20 which is substantially larger, more than twice as large as the aperture 20 shown in FIG. 3, for exposing the entire width of the 35 mm film. Conventional film printers have also provided the option of reducing the aperture width 20 to that as shown in FIG.

3 for the printing of 16 mm film, or less than half the width of the 35 mm film, by passing the film through the aperture in one direction to expose one half of the film strip and then passing the film strip through the printer in the other direction to expose the other half of the same film strip. The film strip is then cut into two 16 mm film strips. In these prior art printers, a stationary guide rail is used at the center of the film strip as shown in FIG. 3, to support the film and to support the edge of a preprint 16 mm film which would extend halfway from the sprockets to the other side of the opening for the 35 mm film. These stationary guide rails have caused many problems, including scratching of the film, accumulating dirt or other particles, and causing the buildup of heat as a result of frictional forces, particularly in highspeed motion picture film printers. The present invention alleviates most of these problems by providing a type of guide rail which rotates and thus, does not provide friction against the film. However, since a printing light beam travels along the path shown by arrow A, a conventional idler ring could not be used since it would obstruct the path of the printing light beam.

To this end, the printing head assembly 10 includes a cylindrical body 30 which is interfit within an internal cylindrical base 32 within the housing 12. The cylindrical housing 12 also includes a vertical trough or cutout defined by vertical surfaces 34 as shown in FIG. 2. The right or rearward end of the housing portion 30 includes a large cylindrical ring or flange 36 providing a shoulder 38 which engages a similar, complementary shoulder or stop surface 40 on the end of the cylindrical housing 12. The flange 36 terminates in a reduced hub portion 42, as shown in FIGS. 2 and 3.

The vertical walls 34 of the trough terminate at the periphery of the housing 12 with a chamfered surface 44 to prevent any sharp edges from scratching the film strips during insertion or removal. The contacting surface 30 of the head assembly extends inwardly from the shoulder 38 to another downward shoulder 46 such that the surface 46 will lie in the same plane as the trough surface 34, and in engagement with a small peripheral flange 48 all of which remain stationary during film printing.

The entire housing 30 includes an internal cavity 50 defined by a plurality of stepped cylindrical surfaces 52 (FIG. 2). A main support shaft 56 is mounted within the hub 42 and secured therein by a set screw 58. In the preferred embodiment, the shaft is secured with its axis lying in a vertical plane and forming an angle of approximately 5° with the horizontal. The shaft, as seen in FIG. 2 and dotted lines in FIG. 1, extends from the end of the hub 52 through the entire length of the head assembly 10 in an interior point generally adjacent the printing light beam reflector (not shown). Means defining a movable film support, generally designated 60, are provided to support the center of a 35 mm film strip or the remote edge of a 16 mm film strip opposite the printing drive sprocket 24. The support means includes a rotating idler ring or shoulder 62 which is coaxially mounted on the shaft 56 for rotation thereabout.

The idler ring or rolling shoulder 62 is secured to the left end of a cylindrical support member 64. The cylindrical support 64 is formed integrally with a converging cone section 66 which mounts to one end of a hub 68 for rotatably mounting the same. A pair of ball type bearings 70 at opposite ends of the hub 68 mount the hub to the stationary shaft 56. A cylindrical spacer 72 maintains the bearings 70 in their proper spaced alignment and a pair of bearing seals 74 shield the bearing chamber to prevent the leakage of any lubricant. Thus, the rolling shoulder 62 is mounted for rotation, as described, in a plane which is offset approximately 5° from the vertical to provide clearance for passage of the printing light beam along its path. As shown, the outer peripheral surface of the rolling shoulder is parallel to the axis of the stationary mounting shaft 56 but could easily be provided in any other form, for example, it could be tapered slightly toward the right so as to make a flush contact with the film. It can be seen that during movement of the film strips across the aperture 20 by the sprocket 24, the contact between the film and the rolling shoulder 62 will cause the shoulder to reach a surface velocity at the periphery equal to the rate of film travel. Thus, the film will not be subjected to scratching or frictional heat buildup as occurs in conventional film printers.

The aperture 20 is provided in an aperture jaw 78 mounted on the left end of the stationary shaft 56. The aperture jaw includes a semi-cylindrical surface 80 having the aperture 20 formed therein by providing a slot at the forward end which does not extend completely through the partial cylindrical surface 80. As can best be seen in FIG. 3, the aperture jaw 78 is tapered outwardly from the center point because of the inclination of the rolling shoulder from the vertical. The forward vertical end of the aperture jaw 78 also includes a small shoulder 82 which fits within a complementary shoulder (not shown) typically provided on the drive sprocket 24 to provide a shield therebetween to prevent accidental exposure of the film to the printing light beam.

Referring to FIG. 2, the aperture jaw 78 is mounted to the left end of the shaft 56 by a conical element 86 and a partial cylindrical element 88 of smaller outside diameter but identical inside diameter as the aperture jaw 80. Preferably, the conical element 86 is secured to the shaft by a set screw 90 at a reduced diameter flange 92 at its smaller end. Note that in the preferred embodiment, the aperture jaw and elements 86 and 88 are mounted at a 5° angle with respect to the shaft 56 so as to maintain coaxial alignment with the cylindrical axis of the housing 12. Thus, the aperture 20 provided thereby remains stationary with the surface of the aperture jaw 80 lying in a congruent arcuate plane with the film which is driven past the aperture 20. Thus, the entire assembly is a radical departure from conventional film printers which merely supported the passing film by a stationary rail causing excessive wear and damage to the film as a result of ordinary frictional forces and abrasive forces due to contaminants. As can be seen from the top of the head assembly 10 in FIG. 3, the rolling shoulder 62 rotates in a plane slightly offset from the vertical but that its engagement with the film strips, occurring approximately through an arc of 30° at the top thereof, does not cause any significant friction and therefore heat or abrasive forces to be generated.

The foregoing detailed description has been given for clearness of understanding only and no unnecessary limitations should be understood therefrom as some modifications will be obvious to those skilled in the art.

I claim:

1. A printing head assembly for a motion picture film printer, comprising:
   means defining a film printing aperture;

means for engaging one edge of a web of film and moving the film past the aperture at a predetermined rate; and a narrow film support rail for rotatably supporting a small portion of said film web at a location remote from the edge engaged by said moving means to reduce the area of contact between the film web and the printing head.

2. The printing head assembly of claim 1 wherein said moving means comprises a driven sprocket for engaging sprocket holes in the edge of the film.

3. The printing head assembly of claim 1 wherein said rotatable rail is freely rotatably mounted by a shaft and driven by frictional forces between the film support rail and said film web as the web is driven past the aperture.

4. The printing head assembly of claim 1 wherein said film support rail mounting shaft is mounted at a predetermined angle with respect to the plane of said film web.

5. The printing head assembly of claim 4 wherein said predetermined angle is approximately 5°.

6. The printing head assembly of claim 1 wherein said printing aperture is defined by a notch formed in an arcuate surface adjacent said film moving means.

7. A printing head assembly for exposing raw stock film with a preprint film in a contact film printer having a driven sprocket for moving the raw stock film and preprint film past a printing aperture at a predetermined rate, comprising:
  means providing a printing light beam;
  means directing said printing light beam through the printing aperture to expose the raw stock film with said preprint film;
  a narrow film guide rail freely rotatably mounted for supporting a portion of said preprint film at a location remote from edge engaged by said driven printing sprocket to reduce the area of contact between the film web and the printing head; and
  means for mounting said film guide rail at a predetermined angle with respect to the plane of travel of said film.

8. The printing head assembly of claim 7 wherein said predetermined angle is approximately 5°.

9. A printing head assembly for exposing raw stock film with a preprint film in a contact film printer, comprising:
  a film printing aperture;
  means providing a printing light beam;
  means for directing said printing light beam through the printing aperture to expose the raw stock film with said preprint film;
  drive means including a drive sprocket for moving the raw stock film and preprint film past the printing aperture at a predetermined rate;
  means for maintaining said raw stock film and said preprint film in contact with one another as said film strips are moved past the printing aperture; and
  a freely rotatable, narrow, film support rail mounted adjacent said printing aperture at a predetermined angle with respect to the plane of travel of said film web for supporting the preprint film at a point spaced from the edge engaged by said sprocket for reducing frictional forces applied to the preprint film.

10. The printing head assembly of claim 9 wherein said predetermined angle is approximately 5°.

11. The printing head assembly of claim 9 wherein said film support rail is rotatably supported by a stationary shaft.

12. The printing head assembly of claim 11 wherein said printing aperture is defined by means secured to said stationary shaft.

13. A printing head assembly for exposing raw stock film with a preprint film in a contact film printer, comprising:
  means defining a film printing aperture including an arcuate surface tapering outwardly from the aperture to predetermined lengths on either side thereof;
  means providing a printing light beam;
  means for directing said printing light beam through the printing aperture to expose the raw stock film with said preprint film;
  drive means including a drive sprocket for moving the raw stock film and preprint film past the printing aperture at a predetermined rate;
  means for maintaining said raw stock film and said preprint film in contact with one another as said film strips are moved past the printing aperture; and
  a freely rotatable film support rail mounted by a stationary shaft adjacent said printing aperture at a predetermined angle with respect to the plane of travel of said film web for supporting the preprint film at a point spaced from the edge engaged by said sprocket for reducing frictional forces applied to the preprint film wherein the means defining the printing aperture is secured to said shaft.

14. The printing head assembly of claim 13 wherein said drive sprocket includes an inwardly directed shoulder and said arcuate surface includes a complementary shoulder for interfitting said inwardly directed shoulder to prevent possible exposure of the raw stock by the printing light beam adjacent the drive sprocket.

15. A printing head assembly for exposing raw stock film with a preprint film in a contact film printer, comprising:
  means defining a film printing aperture;
  means providing a printing light beam;
  means for directing said printing light beam through the printing aperture to expose the raw stock film with said preprint film;
  drive means including a drive sprocket for moving the raw stock film and the preprint film past the printing aperture at a predetermined rate;
  means for maintaining said raw stock film and said preprint film in contact with one another as said film strips are moved past the printing aperture; and
  a freely rotatable film support rail mounted adjacent said printing aperture at a predetermined angle with respect to the plane of travel of said film web for supporting the preprint film at a point spaced from the edge engaged by said sprocket for reducing the frictional forces applied to the preprint film, said drive sprocket including an inwardly directed shoulder and said means defining a printing aperture including a complementary shoulder for interfitting with said inwardly directed shoulder to prevent possible exposure of the raw stock by the printing light beam adjacent the drive sprocket.

16. The printing head assembly of claim 15 wherein said predetermined angle is approximately 5°.

17. The printing head assembly of claim 15 wherein said film support rail is rotatably supported by a stationary shaft.

* * * * *

UNITED STATES PATENT AND TRADEMARK OFFICE
CERTIFICATE OF CORRECTION

PATENT NO. : 4,155,646
DATED : May 22, 1979
INVENTOR(S) : Walter Hrastnik

It is certified that error appears in the above—identified patent and that said Letters Patent are hereby corrected as shown below:

Column 1, line 45, after "film", insert --printing--.

Column 2, line 61, change "down" to --shown--.

Column 5, Claim 7, line 3, after "driven", insert --printing--.

Signed and Sealed this

Sixteenth Day of June 1981

[SEAL]

Attest:

RENE D. TEGTMEYER

*Attesting Officer*      *Acting Commissioner of Patents and Trademarks*